US008836569B1

(12) United States Patent
James

(10) Patent No.: US 8,836,569 B1
(45) Date of Patent: Sep. 16, 2014

(54) SYNTHETIC APERTURE RADAR SMEARING

(75) Inventor: Jesse Clopton James, Huntsville, AL (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 08/273,576

(22) Filed: Jul. 11, 1994

(51) Int. Cl.
| | |
|---|---|
| *H01Q 17/00* | (2006.01) |
| *H01Q 15/00* | (2006.01) |
| *H01Q 15/14* | (2006.01) |
| *F41H 3/00* | (2006.01) |
| *F41H 3/02* | (2006.01) |
| *G01S 13/90* | (2006.01) |

(52) U.S. Cl.
CPC .............. *H01Q 15/14* (2013.01); *H01Q 17/002* (2013.01); *G01S 13/90* (2013.01); *F41H 3/00* (2013.01); *F41H 3/02* (2013.01)
USPC .................................................. 342/3; 342/6

(58) Field of Classification Search
CPC .............. G01S 13/90; F41H 3/00; F41H 3/02; H01Q 15/14; H01Q 17/002
USPC ................ 342/1–6, 10, 11, 12, 13, 14, 15, 20
See application file for complete search history.

(56) References Cited

U.S. PATENT DOCUMENTS 4,675,677 A * 6/1987 von Maydell et al. ...... 342/25 A

FOREIGN PATENT DOCUMENTS

| DE | 4304027 A1 | * | 8/1994 |
| GB | 1314624 A | * | 4/1973 |
| GB | 2165413 A | * | 4/1986 |

* cited by examiner

*Primary Examiner* — John B Sotomayor
(74) *Attorney, Agent, or Firm* — Alston & Bird LLP

(57) ABSTRACT

A synthetic aperture radar's surveillance is defeated by electronic camouflage that employs a protective shield to cover an intended target. The shield intercepts and modifies the interrogating radar pulses by modulating incident radar pulses to produce radar echoes shifted in Doppler frequency, whereby the returned echoes give a false depiction of the target, even to smearing the radar display. New structures are presented that exhibit variable reflectivity and variable dielectric characteristics of particular use in the foregoing and other electronic systems.

47 Claims, 9 Drawing Sheets

A mechanical and electrical scheme for shielding ridge 77.

Schematic of one of the loops 79 inside cylinder 78.
Brushes 87 and battery 84 do not rotate.

Schematic of two loops inside cylinder 78
showing commutators 85(+) and 86(-).

SYNTHETIC APERTURE RADAR SMEARING

FIELD OF THE INVENTION

This invention relates to a method and apparatus for electronically camouflaging vehicles and/or other potential targets to surveillance by synthetic aperture radar and, more particularly, to a device for smearing the radar's display, rendering potential targets unidentifiable. The invention also relates to devices for switching reflectivity levels to incident RF energy at high change rates.

BACKGROUND

Synthetic aperture radar, abbreviated SAR and sometimes referred to as a "look down" radar, is an instrument of choice for permitting aircraft and spacecraft, moving overhead, to monitor ground and naval operations occurring below. Such surveillance radar possesses the ability to "see" at night and the ability to see through fog and clouds, producing a map of the underlying surface topology as seen by the radar's emitted radar pulses. Presented on the radar's display, the map is of high resolution, permitting the radar operator to view essential buildings, ships, military tanks, trucks and other apparatus of military and commercial relevance on the surface underneath.

In common with other types of radars, synthetic aperture radar includes a radar transmitter, antenna, radar receiver and radar display, such as a cathode ray tube. Pulsed RF generated by the transmitter is emitted from the antenna and, following the transmission of each pulse, the receiver "listens" for echoes of such RF pulse, the radar echo, as may be reflected from a radar reflective surface. The receiver and ancillary circuits process the returned echo and output the processed echo to the display, where the images, composed from multiple echoes serially received, may be viewed by the operator.

As carried by an aircraft or spacecraft, the SAR's radar pulses are generated and directed by the antenna in a wide beam downwardly and to one or both sides of the craft, toward the surface below. Because of the motion of the SAR the wide beam sweeps a long, wide area on the ground. The SAR receiver and processor continuously interpret the returned echoes and categorize echo components according to Doppler shift and range so that, when many echo pulses are received and processed and presented on a radar display, an image of the ground and vehicles is produced. This process is continuous for the entire area swept by the antenna beam.

The SAR's radar display produces an image or map of the surface topology as a composite, revealing as part of such topology, any tanks, trucks and the like reposed in the region. If that mapping information is combined with navigational information, indicating the position of objects on the map, as may be obtained from satellite navigation systems as example, the exact geographical position of the object may be made available to weapons operators, whether aircraft or artillery, and the object is compromised.

The need to provide an effective camouflage for the ground based forces in such circumstances or to hide those forces from such unwanted surveillance is clear. However, apart from accessing and disabling the radar, until the present invention, there was no effective way to conceal one's activities from the radar's surveillance.

SAR's operate typically in the range of 3 to 35 GHz and reveal objects as small as a foot in length. The radar system measures two properties of the radar echoes from which the electronic display is constructed, range and Doppler shift.

Each location on the radar reflective surface on which the RF pulse from the radar is incident, reflects an echo that has a unique set of range and Doppler components. That echo is then interpreted by the radar and is represented on the display in accordance with known technique. The present invention modifies the echo, which the SAR receives and interprets as the regular echo, and, thereby, produces a false picture on the radar display, one that obscures the details of the reflecting surface.

An object of the present invention, therefore, is to electronically camouflage targets, such as vehicles, troops, tanks, ships, and other radar signal reflective structures, to prevent detection and imaging by synthetic aperture surveillance radar; and Another object of the invention is to create "snow" or smear on the synthetic aperture radar's display to conceal objects from the radar and prevent their identification.

SUMMARY OF THE INVENTION

According to the present invention, a protective shield is placed on or over the target object that is to be protected. The shield's electrical characteristics, such as reflectivity and/or permeability, influence incident RF pulses. Suitable control circuits or drivers vary one or more of the shield's characteristics at a very high rate to modify the electronic characteristics of the RF pulses which the shield reflects. In accordance with the invention, a driver modulates the electronic properties of the shield. The driver rapidly varies the characteristics of the shield in the presence of incident RF pulses originating from a synthetic aperture radar, and rapidly changes the phase and/or Doppler frequency of incident RF pulses, effectively modulating the incident pulses to produce dual Doppler shifts, which are returned to the radar system as the echo.

Effectively the frequency of the radar echo reflected from the shield is shifted from the frequency of the incident radar pulse in such a way as to produce false pictures on the radar's display, smearing the display. The target object is thus electronically camouflaged. With the protection the present invention provides, the radar operator can no longer identify the protected object or its location.

As those skilled in the art appreciate the protective shield may be applied in a variety of different forms; separate from the protected object, such as a blanket or umbrella and/or integral therewith, such as a covering layer residing on the protected object.

New forms of variable reflectivity devices are also defined that are useful to the foregoing application and for other applications as well. In one specific embodiment the shield comprises a variable reflectivity laminate that includes a thick layer of dielectric material; a thin top layer of material that has a conductivity characteristic that is changeable from transmissive to electrically reflective states, suitably a photosensitive material, and a reflective bottom layer. When the top layer is exposed to light, it becomes conductive and reflects light; when the light is extinguished, the top layer becomes transmissive to RF, allowing the RF to pass through the dielectric to the bottom reflective layer, which, in turn, also reflects RF, but from a distinctly different position.

With changing transmissivity to RF, the RF reflectivity of the laminate changes. By rapidly changing the RF reflectivity in the presence of an RF pulse, the energy reflected by the laminate is thereby shifted in frequency, or, as other wise stated, the incident RF energy is reflected at higher and lower frequencies, symmetrically located relative to the incident frequency.

In another form of variable reflectivity device, a plurality of photoconductive rods of various lengths, but less than one quarter wavelength at the frequency of incident RF, are distributed at random and suspended in a solid dielectric matrix. In still other embodiments light sensitive wafers or voltage controlled switches are arranged in a electrically conductive grid on the surface of a dielectric layer as may be controlled to alternately block passage of RF and allow transmission. And in still another embodiment magnetic flux pulses are applied to alternate the magnetic state of magnetic particles embedded in a solid matrix, thereby changing the permeability of the matrix to incident radar signals.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
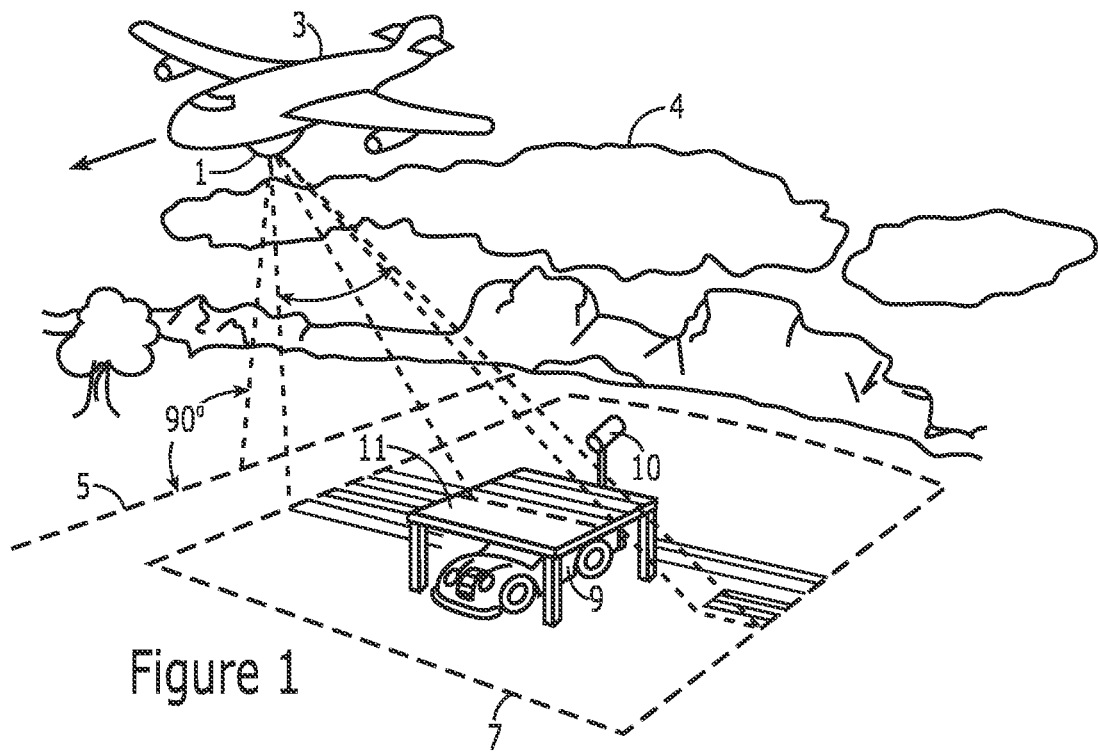
FIG. 1 pictorially illustrates the protective shield in application to a protected vehicle with the shield deployed in an operational environment under surveillance of a synthetic aperture radar.

As generally represented in FIG. 1, radar 1, carried by aircraft 3, moves over the clouds 4 along a route indicated by dash line 5 on the ground surface. The radar "looks" sideways and down, its beam of pulsed RF extending sideways across a region of ground 7 to one side of the aircraft's route. As the aircraft travels forward, its radar continues to electronically view the region from slightly different celestial positions, as is conventional to synthetic aperture type radars. A truck 9, a potential target, is located within the region being surveyed. The truck however is garaged under cover of countermeasure shield 11, which is supported over the truck by posts of low reflectivity material, and, as hereafter described, remains effectively hidden from the radar. A light source 10, which may appear to the radar as a rock if the radar's resolution is sufficient to detect it, is mounted over and illuminates protective shield 11.

As viewed in the not to scale pictorial partial section view of FIG. 2, to which reference is made, shield 11 is a laminate of thin layers 13 and 15 and an intermediate layer 14, with layer 13 being suitably formed of photosensitive material as later herein described. The intermediate layer is a dielectric material and is one-fourth of a wavelength in thickness at the wavelength of RF emitted by radar 1. More specifically, its thickness, expressed in meters, is determined by $c/(4fn)$, where c is the velocity of light, f is the frequency in Hertz and n is the refractive index of the material. As example for common synthetic aperture radar frequencies of S, X and K Bands, with the refractive index equal to unity, such as that of air, the thicknesses of the dielectric are 0.98, 0.3 and 0.08 inches, respectively. The material should have a low relative dielectric constant, suitably no greater than 2. Most dielectric materials have a magnetic permeability that is near unity; and for those dielectric materials the refractive index is equal to the square root of the material's dielectric constant.

In specific form the dielectric is formed of a sheet of rigid non-conducting plastic or plastic foam. In alternate embodiments the dielectric could be formed of compressed air, in which case the two thin layers are spaced the requisite distance by thin plastic threads or other thin electrically non-conductive spacers. In still other embodiments the shield is formed of a rubberized bladder having the layers 13 and 15 as coatings on the outer upper and lower surfaces of a flexible, transparent, low dielectric constant material.

Layer 13 is formed of photosensitive material, such as Gallium Arsenide, Gallium Nitrite, and/or a photosensitive polymer, as examples. It is very thin, negligible with respect to the wavelength of the radar's RF pulse frequency. The photosensitive material acts as an insulator when in the dark, but changes to a conducting state when light is shined upon it. Layer 15 is formed of any electrically conductive material. In practical application in which the structure is formed directly on the protected vehicle, instead of as a separate cover or blanket, when the vehicle is made of electrically conductive metal, such as steel, the outer surface of the vehicle may directly serve as the layer 15.

Light source 10, suitably is a conventional laser, which emits a coherent form of light and can cover the entire surface of shield 11 by means of a light diffuser or numerous light guides. Or source 10 may be formed of a large number of lasers. The laser has the desired capability of being switched from the light emitting condition to the off condition at high rates under control of a suitable driver 16 and power supply 18. The laser is selected to provide light of the proper wavelength for activating the photosensitive material. Gallium Arsenide, it is recognized requires that the exposing light be of or less than a prescribed wavelength to achieve activation. Suitably the laser is one that is small in size and high in efficiency. Where lesser switching rates are acceptable, as in the lowest frequencies used in the synthetic aperture radar systems, then conventional flash tubes or pulsating arc lamps may be substituted for the laser. Moreover, the flash tube has a wider beam and, hence, directs the light that it produces over greater surface areas than the laser.

In operation in the presence of the incident RF pulses from radar 1, the upper surface or layer 13 is alternately made electrically conducting and nonconducting, periodically, by the rapidly flashing light source 10. Bottom surface 15 is always electrically conducting and, hence, always reflective to radar pulses. When the upper surface is conducting, the radar echo is reflected from the upper surface of the laminate. When non-conducting, most of the radar echo returned to the radar is reflected from bottom surface or layer 15. The rate of flashing of light source 10 and the corresponding change in conductivity of upper layer 13 is high, as example, occurring at a 500 KHz rate. It is noted that, if dielectric 14 is formed of transparent material, then light source 10 may be located below surface 13.

Figure 3:
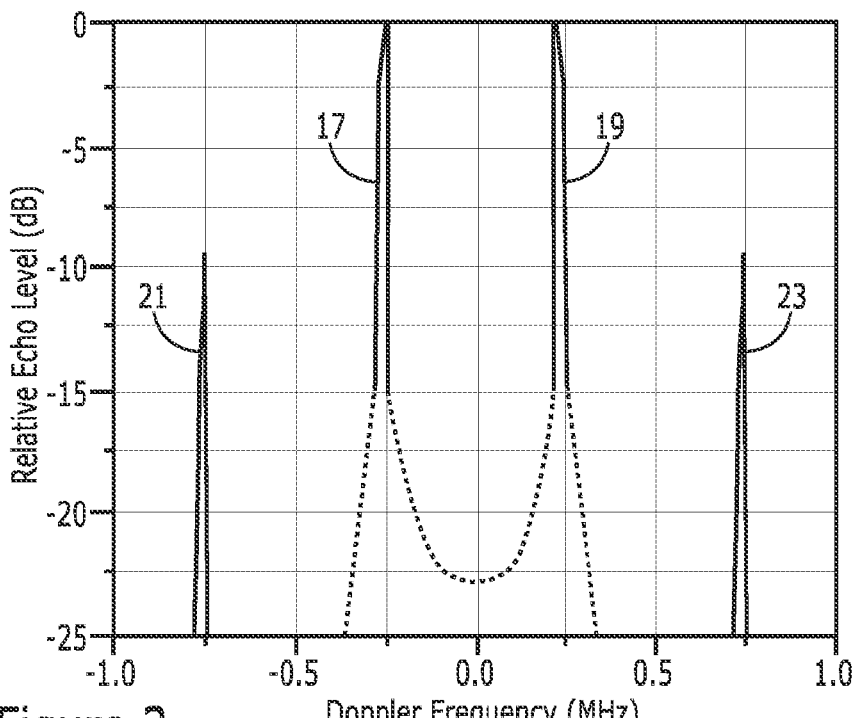
FIG. 3 graphically illustrates the radar echo's Doppler frequencies produced in operation of the embodiment of FIGS. 1 and 2.

Assuming dielectric layer 14 has a lossless electronic characteristic, the result is depicted graphically in FIG. 3, which shows the frequencies and relative amplitudes of the reflected radar echoes as against the Doppler frequency. The incoming energy is converted or shifted into sidelobes. The foregoing effect produced on the incident radar pulse is analogous to the sidelobe frequencies produced on a radio communication carrier that is phase or amplitude modulated. Some energy goes into the sidelobes in both. The fraction of energy diverted into sidelobes depends upon the phase and amplitude characteristics of the modulator, which in the invention, is the countermeasure shield.

As illustrated in FIG. 3, when the reflecting surface is modified at a 500 KHz rate, alternately reversing the phase of the reflected RF pulse each time by 180 degrees very rapidly, the frequency spectrum of the radar reflection is characterized by two principal sidelobes, 17 and 19 each separated by 250 KHz from the frequency of the incident radar pulse and two minor sidelobes 21 and 23.

When the driving pulses of light from flashing light source 10 are uniform in amplitude and duration, the first sidelobes are always separated by the modulation rate. Thus sidelobe 17 is separated from sidelobe 19 in the figure by 500 KHz, the shift rate given in the example. The frequency of the RF pulses transmitted by the synthetic aperture radar lies half way between those two sidelobes, which is at zero Doppler in the figure.

The synthetic aperture radar aboard the aircraft receives the returned echo and interprets that echo as two weaker targets at two incorrect locations. The synthetic aperture radar also perceives two additional false and very weak targets defined by lobes 21 and 23 located at −0.75 and +0.75 MHz. Where the protective shield covers the entire vehicle as in FIG. 1, the radar cannot perceive a target at the correct location, since there is no echo energy at zero Doppler.

In the foregoing example, the reflection characteristics were shifted at a 0.5 MHz rate. Higher or lower shift rates could be substituted as desired. A lower rate, on the order of 10 KHz serves well for X Band and aircraft synthetic aperture radars. A higher rate on the order of 1 MHz serves best for a 35 GHz synthetic aperture radar carried by a space satellite.

Figure 4:
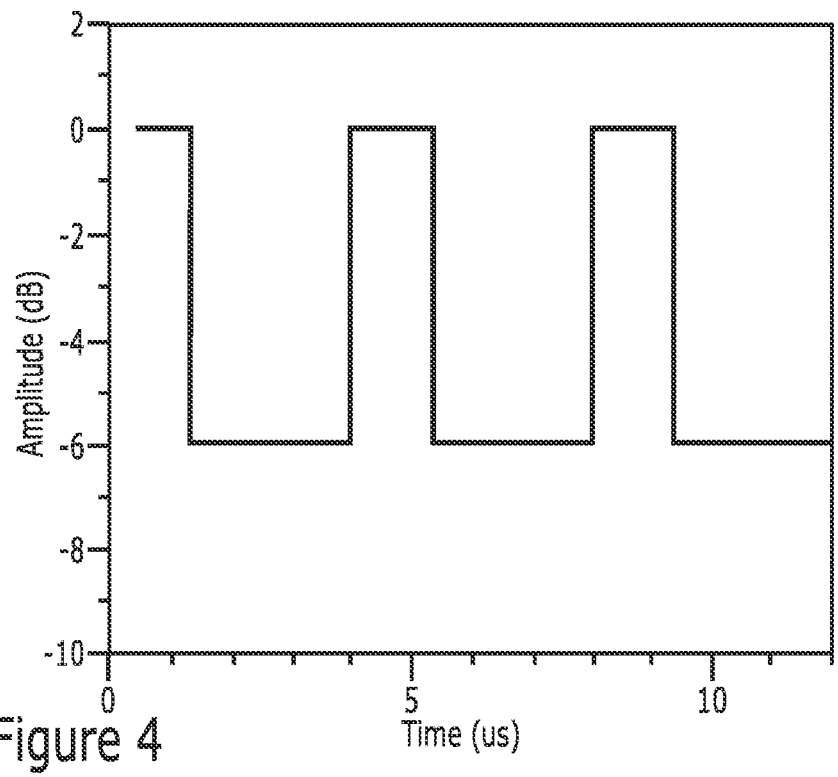
FIG. 4 illustrates a preferred echo waveform showing the change of state of the light source.

With some electrical loss occurring in dielectric 14, the pulsing or modulation rate of the light source may be adjusted to offset the effect of the loss. For example, assuming a 6-db loss in RF signal propagation from front 13 to back 15 through the dielectric and then return to the front, 13, and the dwell time for the period of reflection from the lower level, 15, is twice as long as for the upper level 13, the RF spectrum is equivalent to that shown in FIG. 3; and the RF echo amplitude versus time is shown in FIG. 4. FIG. 3 is the RF spectrum of the echo plotted in FIG. 4.

Figure 5:
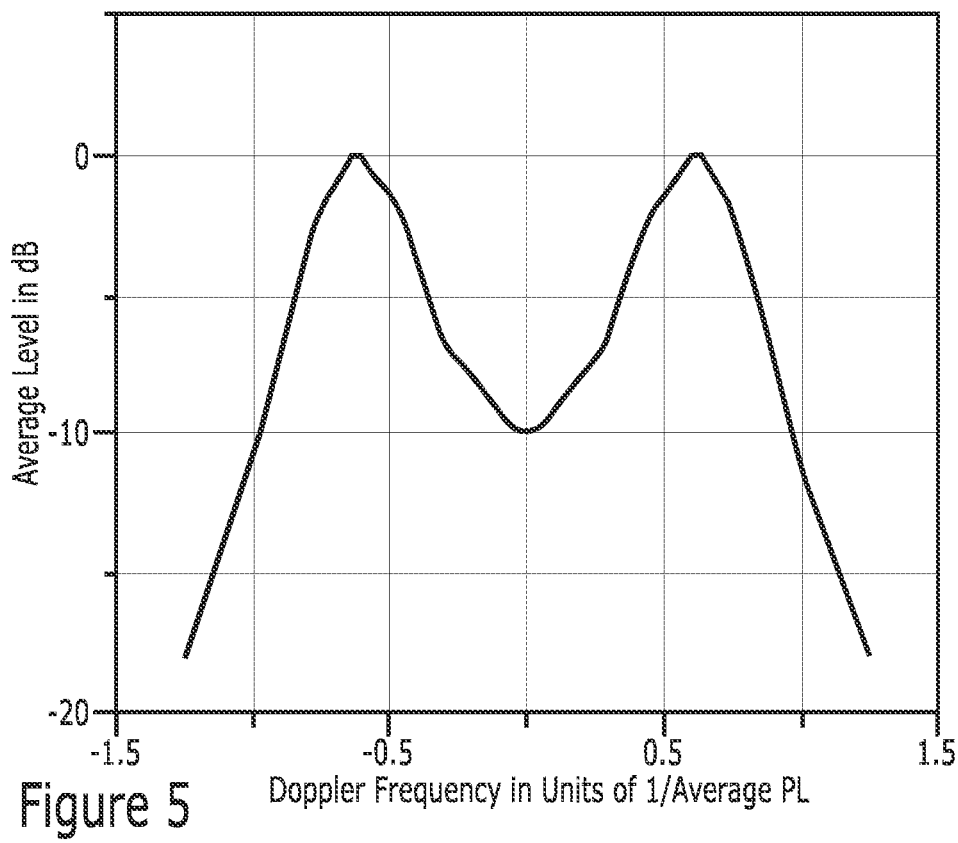
FIG. 5 illustrates a waveform of Doppler frequency occurring through continuous variation of pulse length of the light source.

The pulse length may be varied to create smearing on the radar's display. Reference is made to the spectrum illustrated in FIG. 5 which graphically illustrates the average signal level of the radar echo, expressed in decibels, as against Doppler frequency, expressed in units of 1/Average PL and depicts the mean Doppler spreading for two levels of reflection when the pulse length is randomly varied by one hundred percent. The pulse length, PL, is one on-off cycle time for the light source. When PL is varied, the RF spectrum is more like that presented in FIG. 5 than in FIG. 3.

As those skilled in the art appreciate, considered from the standpoint of the surveillance radar, the foregoing figure represents smearing as is caused on the radar's display through use of a variable pulse rate. Such smearing is preferable because it tends to hide other targets. A smeared image is "noisy" or snowy", much like that which occurs when viewing a weak television station. When the rate of shifting is too large, the false targets are shifted off of the imaged area; that is off the observed field being viewed on the radar operator's display. In order for the picture to be made "snowy", thus, the switching or flashing rate should be low enough to keep most of the false targets within the imaged area. A switching rate of just one Kilohertz or less can cause the imaged object to be defocused.

Figure 6:
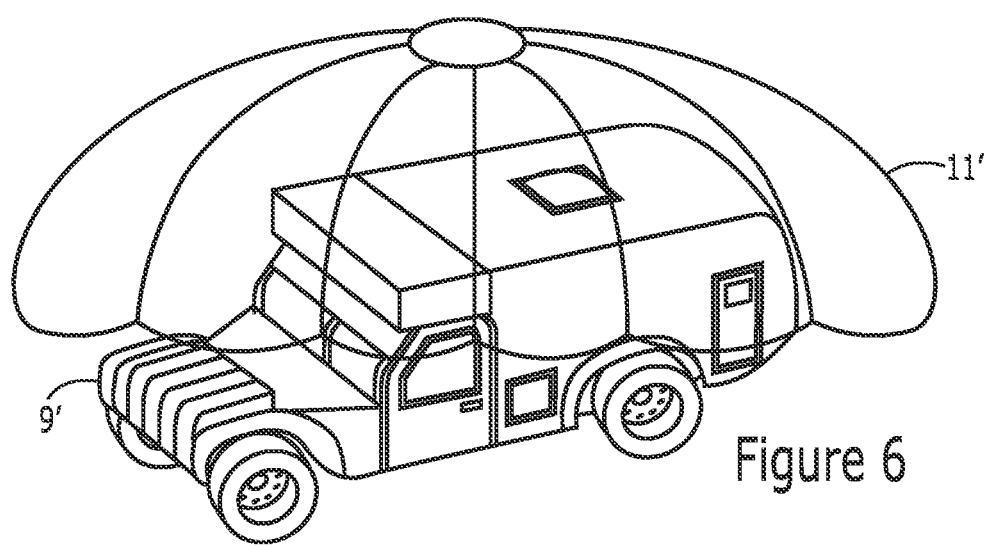
FIG. 6 pictorially illustrates another form for the protective shield.

Although the foregoing embodiment employed a relatively flat rigid cover, it may be adapted to other specific forms that are more conveniently packaged and stored. As pictorially illustrated in FIG. 6, the form of the shield 11' is in the form of a foldable umbrella of conventional mechanical structure, excepting for the structure of the umbrella's material, which is the multilayer arrangement earlier illustrated in FIG. 2. This form is more useful with small sized objects. The umbrella is opened and positioned atop the protected truck 9' as illustrated to protect the vehicle from detection.

Figure 2:
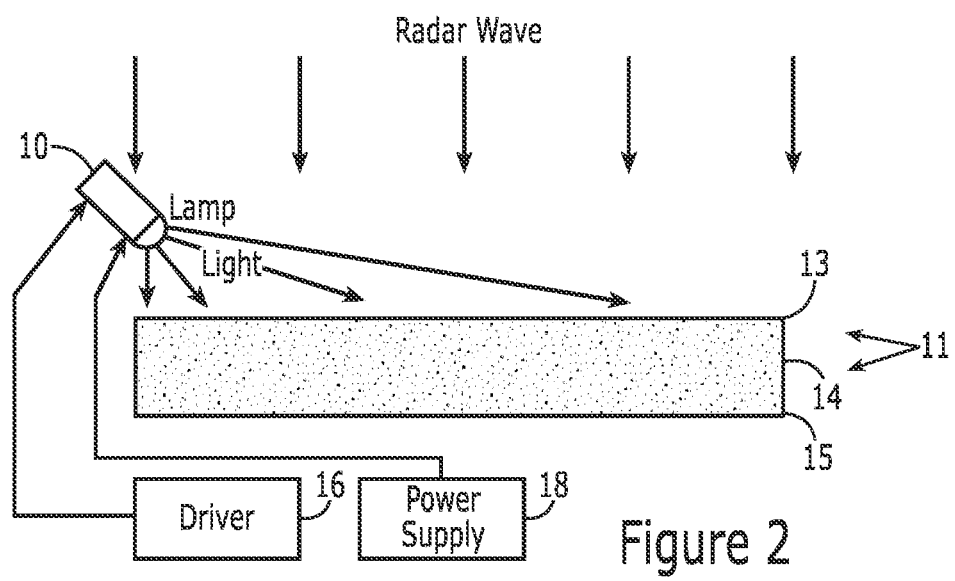
FIG. 2 is a section view of a portion of the protective shield used in FIG. 1.

Shield 11, in an alternative embodiment, may be formed of a coating of sensitive material as in FIG. 2 that is directly and permanently applied onto the high reflective areas of the protected vehicle. In that alternative, the metal surface of the vehicle may also serve the equivalent function of bottom layer 15. In still another embodiment, a shield structure is illustrated in partial section view in FIG. 7, to which reference is made. There, shield 25 is capable of providing three levels of reflection. The laminate structure incorporates three layers, top 27, middle 29 and bottom 31 and two dielectric layers 28 and 30 that are sandwiched between those layers. Top layer 27 is capable of being changed from the RF conductive or transmissive state, in which the layer allows incident RF to pass through, to a non-conductive or reflective state, in which the incident RF is reflected from the surface and is essentially the same material as used in the embodiment of FIG. 2. Middle layer 29 may be identical to layer 27 and have equivalent electrical properties. Bottom layer 31 is always in the conducting state. As in the prior embodiment in practical application in which the structure is formed directly on the protected vehicle, instead of as a separate cover or blanket, when the vehicle is made of electrically conductive metal, such as steel, the outer surface of the vehicle may directly serve as the layer 31.

Figure 7:
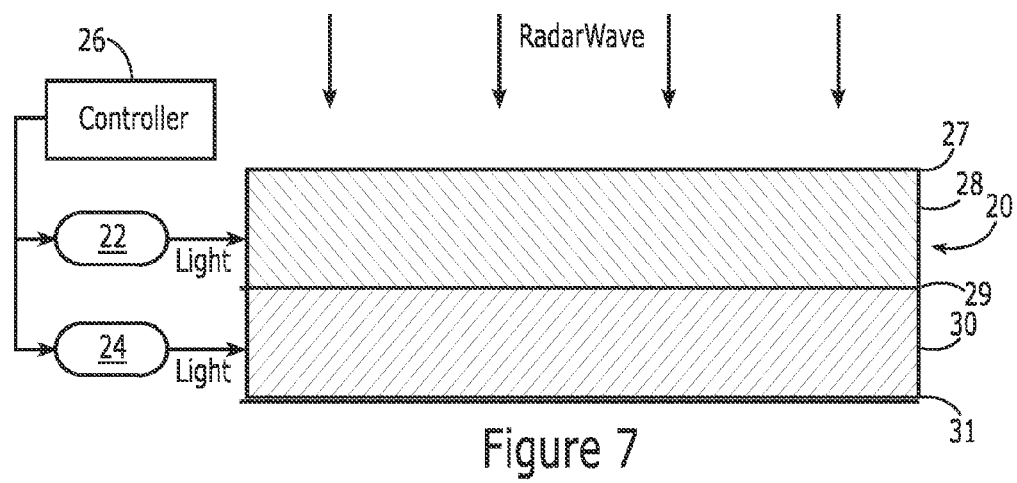
FIG. 7 is a partial section view of an alternative embodiment of a protective shield.

The dielectric layers are each one sixth of a wavelength thick and have a low dielectric constant. As a consequence of the thickness, smaller than in the preceding embodiment, the reflection or echoes from the multiple surfaces are separated 120 degrees in phase rather than 180 degrees as in the preceding embodiment. Two or more light sources, symbolically illustrated as 22 and 24 in FIG. 7, are required for the two photo-sensitive surfaces. The light sources control the reflectivity of the photo-sensitive surfaces. Such sources may be the same as source 10 of FIG. 1 or equivalent type. Light pulses from those sources to the sensitive surfaces 27 and 29 may be transmitted through the dielectrics 28 and 30 when they are transparent, or, alternately, be propagated thereto via fiber optic cables, not illustrated. The two light sources are controlled and synchronized by controller 26.

Figure 8:
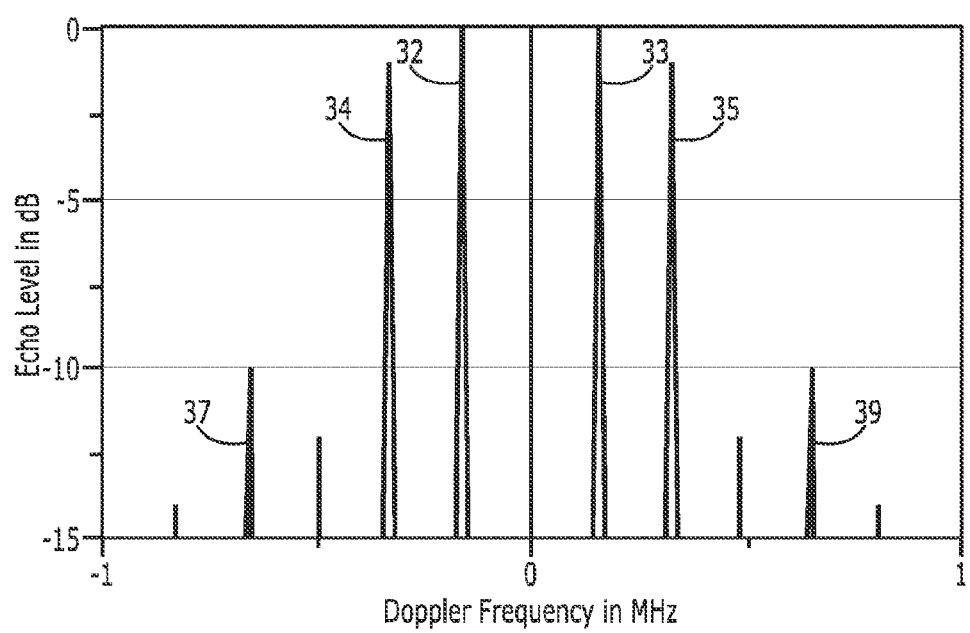
FIG. 8 graphically illustrates a spectrum of frequencies obtained in reflected echoes produced in operation with the embodiment of FIG. 7.

When there is no loss in the dielectrics 28 and 30, the light pulsations of the two light sources are such that surfaces 27, 29, and 31 each reflect the radar signal equal amounts of time to produce an RF spectrum as shown in FIG. 8. When there is loss in the dielectrics, the light pulse durations can be adjusted to produce the same effect as if there were no loss. For example, when the loss in each of the two dielectrics is one dB (decibel), the light pulse durations should be 1.1, 1.7, and 2.2 microseconds, respectively, for surfaces 27, 29, and 31, in order to produce the RF echo spectrum as shown in FIG. 8. The spectrum in FIG. 8 was produced by the stated overall light pulse period of 5 microseconds. Sidelobes 32, 33, 34, and 35 of FIG. 8 each produce a false target in the SAR image, and sidelobes 37 and 39 produce weaker false targets. In an analogous fashion to comparing FIGS. 3 and 5, these sidelobes would be spread in frequency, if the light pulse period were made variable.

By comparing FIG. 8 with FIG. 3 one finds that there are more false targets produced for the three levels of reflection than for two levels. Furthermore, the three level of reflection embodiment is less sensitive to radar frequency. These effects are even stronger for other practical embodiments of the foregoing that provide four or more levels of reflection.

Figure 9:
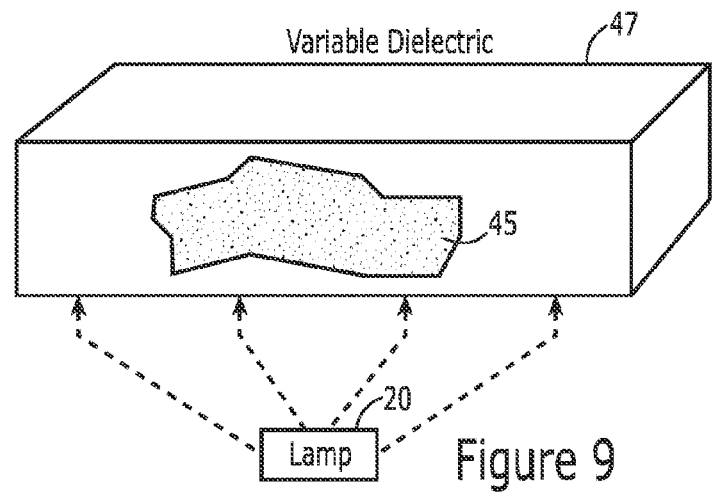
FIG. 9 illustrates a variable reflectivity device that serves as an alternative to that of FIGS. 2 and 7.

In still another embodiment, the shield is formed of a material having a dielectric constant that is variable, such as illustrated in FIG. 9, which illustrates a variable dielectric in cross section. A plurality of short narrow strips or wires 45 of photosensitive material are scattered throughout the transparent layer of dielectric material 47. The strips are randomly oriented, but are not in contact with one another. The strips may be a variety of different lengths, but, notwithstanding, each strip is shorter in length than one quarter wavelength at the radar's frequency. As in the preceding embodiment, a fluctuating light source 20, such as a laser, capable of switching on and off at high rates, is oriented to shine light through the transparent dielectric onto the photoconductive strips. One side of the dielectric, typically the vehicle side, is always electrically conductive. Light enters the dielectric from the sides or through fiber optic light guides via holes in the conducting plate on the bottom of the dielectric.

When a radar wave impinges upon a dielectric surface, the surface reflects the radar wave if the dielectric constant is much greater than unity and the magnetic permeability is unity. However, the radar wave traverses the surface if the relative dielectric constant is near unity in value. All relative dielectric constants employed herein are greater or equal to unity. Embedding conductors in a layer or sheet of dielectric material of a given dielectric constant, increases the layer's dielectric constant overall. The dielectric constant increases when more conductors are embedded. In operation, the modulated light repeatedly and rapidly switches the embedded wires between a conducting and non-conducting state, thereby rapidly modulating the dielectric constant between a unity value and a higher than unity value. As in the preceding embodiments, this embodiment of the shield also shifts the frequency of the reflected radar echoes to the sidelobe frequencies.

Figure 10:
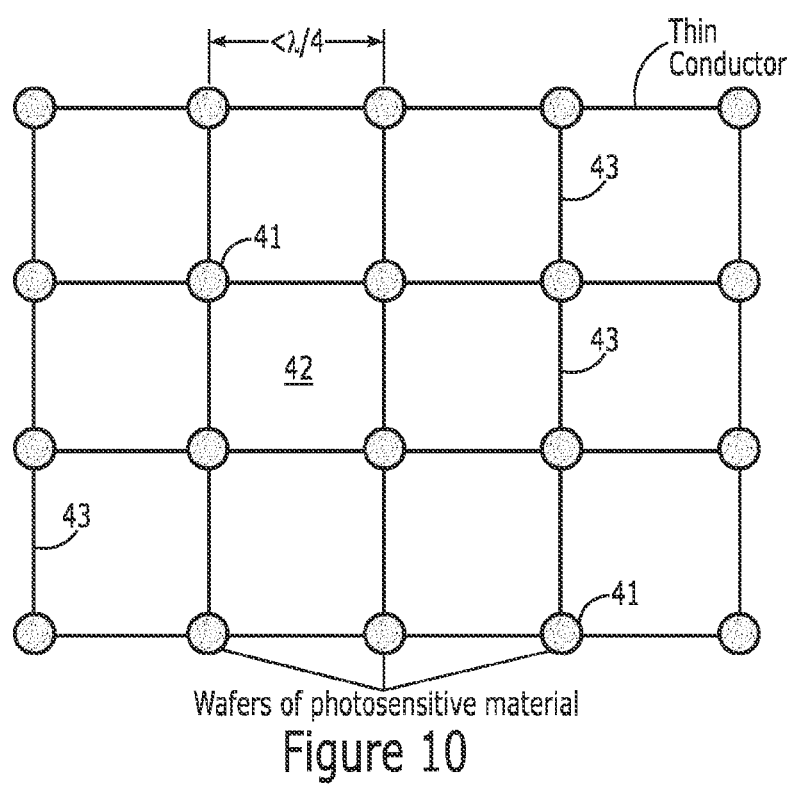
FIG. 10 is a not to scale pictorial top plan view of a photosensor array that serves as another variable reflectivity device useful as an alternative structure for the variable reflectivity devices of the preceeding embodiments.

As an alternative to the continuous sheet or layer of photosensitive material described for the embodiments of FIGS. 2 and 7 or the photosensitive rods in the embodiment of FIG. 9, the photosensitive material is formed in a plurality of discrete or, as variously termed, separate spots spaced about the surface of the dielectric material, such as illustrated in FIG. 10, to which reference is made. As shown in this partial top plan view of the shield, the wafers 41 of photosensitive material are affixed on the top surface of the dielectric material 42. The wafers are approximately evenly distributed about the surface to form an array with the spacing between wafers being appreciably less than one quarter wavelength at the SAR's transmission frequency. A plurality of thin electrical conductors 43 connects each wafer to adjacent wafers to form a uniform square grid on the surface. Each photosensitive spot or wafer 41 is electrically conductive when illuminated and is nonconductive when in the dark. As in the preceeding embodiments, the bottom side of the unit, not illustrated, contains a covering metal layer or may be situated directly atop the protected object, assuming the latter is a metal surface.

When an RF wave impinges on the wire grid of FIG. 10 and when the connecting spots are conductive, the RF wave is reflected, almost as well as though the grid were a continuous sheet. When the spots are not conductive, the RF wave penetrates the grid almost as though it was not present. Such a grid can then replace the sensitive surfaces previously identified in FIG. 2 as 13, 27, and 29. Much less photosensitive material is required with the foregoing grid arrangement. Further, full surface illumination by the light source is not required. An optic fiber can be used to conduct light from a light source, such as the lamp 20 of FIG. 9, to each of the photosensitive spots 41 of FIG. 10.

Figure 11:
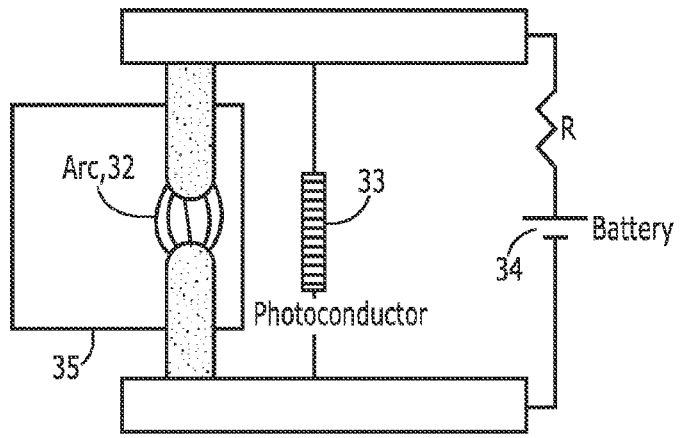
FIG. 11 illustrates a pulsating arc lamp type light source used in connection with the device of FIG. 10 as an alternative to a laser light source used in the embodiment of FIG. 2.

As an alternative to the laser or flashlamps earlier described, a novel light source for generating low pulsing rates that is particularly useful with the variable reflectivity surface of FIG. 10 is next considered and is illustrated in schematic form in FIG. 11, to which reference is made. As presented in the schematic diagram, the source includes a conventional electrical gas type arc lamp. Light emanates from an electrical arc 32 created in the gap between spaced electrodes located within a gas chamber 35. Battery or power supply 34 supplies electrical power for the arc, and photoconductor 33 provides a means of pulsing the light produced by the arc. The photoconductor is optically coupled to the arc 32 and receives light emitted by that arc.

When the light generated by the arc reaches a sufficient magnitude or intensity, photoconductor 33, normally in a non-conducting state, becomes conductive and shunts electrical power from the arc, lowering the voltage applied across the lamp. The voltage falls below the minimum voltage necessary for sustaining the electrical arc, thereby causing the arc to extinguish. As soon as the arc extinguishes, the photoconductor returns to its non-conductive state and electrical power is again available to permit creation of the light producing arc. Since the arc lamp requires application of a minimum predetermined voltage for a specified interval before it again ignites and emits light there is a delay before light is again emitted by the lamp. The foregoing cycle repeats periodically and results in a pulsating light source. As is apparent the foregoing is a form of relaxation oscillator circuit. The rate of light pulsing is determined by various factors including the gas mixture in chamber 35, the characteristics of the photoconductor, and the battery or power supply voltage.

Figure 12A:
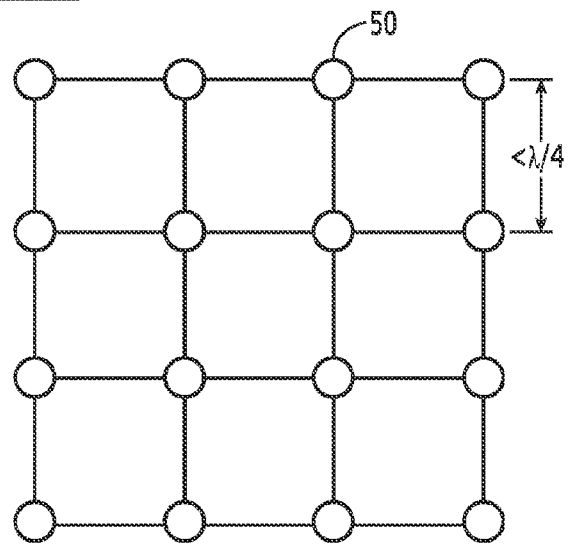
FIGS. 12a and 12b illustrate a grid arrangement formed of switch transistors for controlling the conductivity of a surface.
Figure 12B:
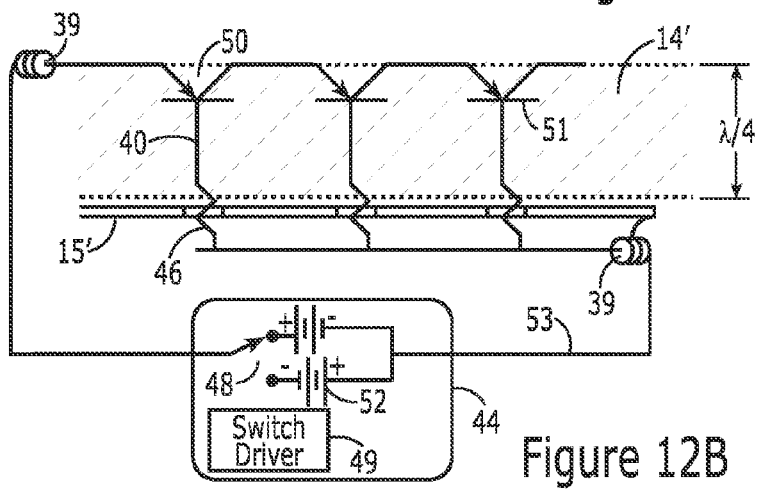

In an alternative embodiment, the light sensitive wafers used in the prior embodiment of FIG. 10 are replaced by switching transistors that are controlled by an electrical voltage as represented in FIGS. 12A and 12B, to which reference is made.

FIG. 12A is a top plan view, which shows the square grid arrangement with transistors 50, only one of which is numbered, located at the intersection points of the grid. FIG. 12B is a cross sectional view of the transistor matrix, which is drawn not to scale and is exaggerated for purposes of illustration. The separation of the transistors must be less than one-fourth wavelength. Transistors 50 may be either of the so called pnp or npn variety. They are selected from the many types available that have high impedance when off and low impedance when on. A metal layer 15' covers the bottom side of dielectric 14'. The metal layer is of a constant reflectivity characteristic to RF.

Controller 44 supplies the on-off control signal to the transistors, which is fed through wires 40 that extend through holes formed in metal layer 15' and penetrate the quarter-wave dielectric 14 at normal incidence and is applied to all the transistors in parallel. Controller switch 48 alternately connects the control line 53 to plus and minus voltages supplied by batteries 52. The switch, 48, is controlled by switch driver 49, symbolically illustrated, which alternates the switches state between the plus and minus polarities. RF chokes 39, in series with the output of controller 44, lead 53, prevent RF currents from entering the controller. The control signal is buffered by a resistor 46 in series with each transistor base 51, and the voltage on each transistor base determines whether the impedance of each transistor 50, from emitter to collector, is high or low.

The embodiment of FIG. 12 is preferred for the lower radar frequencies. For the higher radar frequencies the embodiment of FIGS. 10 and 11 should be easier to construct than the system of FIG. 12.

Still other surfaces exhibit variable reflectivity characteristics useful in the foregoing application, and whose reflectivity can be controlled by application other than light, such as magnetic flux. Those skilled in the art appreciate that the reflectivity of a surface of a dielectric to radar pulsed RF depends not only upon the dielectric's dielectric constant, a characteristic that was employed in some of the preceding embodiments, but on the dielectric's magnetic permeability as well. In the preceding discussion it was tacitly assumed that the dielectric materials had a relative magnetic permeability of unity, which is true of most common dielectrics. However, that is not always correct. A dielectric can be made to have a permeability greater than unity by imbedding small non-conductive particles having a high magnetic permeability.

When the permeability of a dielectric is greater than unity the reflectivity of the material depends upon its impedance Z, which is the square root of absolute permeability divided by absolute dielectric constant, or, stated as a formula in terms of relative permeability and dielectric constant: $Z = 120\Pi (\mu/\epsilon)^{1/2}$.

When the impedance of the material is 377 ohms, the impedance of free space, there is no reflection. In all previous embodiments that used a certain thickness of dielectric, it was mentioned that the dielectric constant of the dielectric should be near unity. That restriction does not apply when the permeability of the dielectric can be increased an appropriate amount to cause the impedance to be $120\Pi = 377$ ohms.

Figure 13:
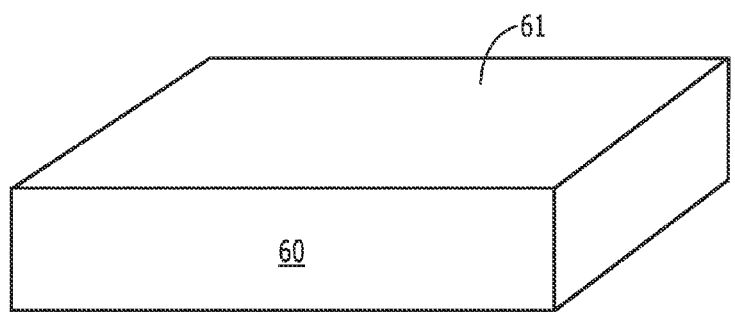
FIG. 13 illustrates a variable reflectivity body containing magnetic powder the reflectivity of which is controlled by magnetic flux.

A dielectric with zero reflectivity to RF is illustrated by FIG. 13 to which reference is made. The base dielectric 60 has a dielectric constant of $\epsilon_1$ and a magnetic permeability of unity before particles are added. During fabrication of the dielectric layer, minute nonconducting magnetic particles 61 are added and are distributed uniformly throughout the dielectric prior to solidifying the dielectric body. Each of those particles is much smaller in physical size than one wavelength, typically of fine powder size. The particles have a relative permeability of $\mu_2$ and a dielectric constant of $\epsilon_2$. In total volume the particles occupy only a few percent of the volume of the dielectric, and the effective dielectric constant and permeability of the resulting matrix can be computed on the percentage basis, or preferably, they should be measured experimentally. As example: When $\epsilon_1$ is 4.1, $\epsilon_2$ is 10.0, $\epsilon_2$ is 210, and the volume occupied by the particles is 2%, then the resulting $\epsilon$ and $\mu$ of the matrix is 4.2 for each and the impedance is 377 ohms.

The permeability and, hence, the reflectivity of matrix material formed by the addition of magnetic particles to a dielectric can be changed by application of magnetic flux that drives the material into magnetic saturation. When the material is in magnetic saturation, the change in flux at a radio frequency is zero, and, so, the material's radio frequency permeability is zero. With the flux reduced below the saturation level, the radio frequency permeability of the material also discernably changes. For the described application, hence, the source driving the material produces magnetic flux that changes at a high rate between a high saturation level and a low level.

Figure 14A:
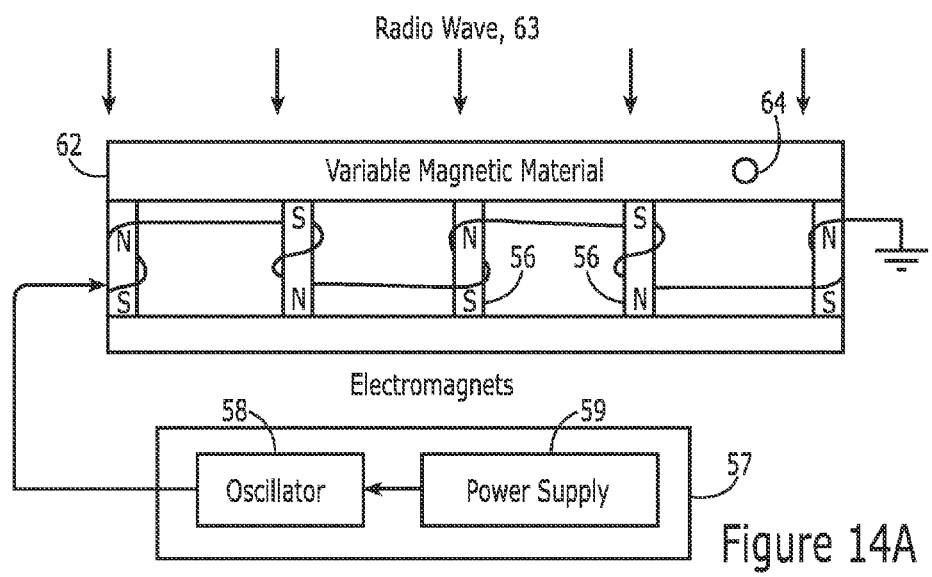
FIGS. 14a and 14b illustrate an alternative embodiment that uses the variable reflectivity device of FIG. 13 and employs magnetic control of reflectivity.
Figure 14B:
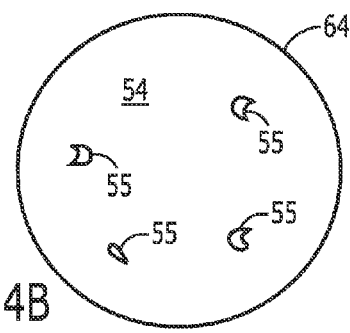

FIG. 14A symbolically illustrates a system employing the foregoing body 60 of FIG. 13. The embodiment includes the variable magnetic material 62, electromagnets 56, and driver circuit 57, containing oscillator 58 and power supply 59. Metal layer 65 covers the bottom side. The metal layer is reflective to RF and pervious to magnetic flux. A portion 64 of the magnetic material 62 is enlarged and illustrated in FIG. 14B. In the latter, the base dielectric is 54 and the added small magnetic particles are shown as 55.

The electromagnets are alternately magnetized at a frequency determined by oscillator 58 to produce pulses of magnetic flux. The reflectivity of the material 62 is changed at twice the frequency of the oscillator. As example, when the relative permeability of the material is 50, with no applied magnetic field, due to 25% of the material being magnetic particles of permeability equal 200, and when the dielectric constant of the material is 50, then the reflectivity is zero with no applied field. When the particles are driven to magnetic saturation by the electromagnets, the reflectivity will be about 75%. The variable magnetic material then becomes a protective shield for ground vehicles or other objects on the ground or sea to be hidden from the radar.

By rapidly changing the protective shield's reflectivity, the shield effectively modulates the incident RF. That reflectivity is controlled by exposure to energy that is sufficiently distinct in character from the form of energy in the radar's RF, so that the latter RF energy does not itself cause the reflectivity change: Light, which is a higher frequency of the same kind of energy as the RF and magnetism, which is a different form of energy. Other forms of variable reflectivity dielectrics as may be created in the future having the aforedescribed characteristics may thus be substituted in the combination.

Still another type of variable reflectivity surface is a mechanically vibrating surface, in which the position of the reflecting surface changes physically. Although not possessing the preferred characteristics of the preceeding embodiments of the invention, a reflecting surface that is vibrated is useful in limited situations, especially those cases not requiring a large change in frequency or shift in the echo and cases having a small radar wavelength, and may be employed alone or in combination with the foregoing embodiments. These mechanical vibrators will be more useful for defocusing the SAR image rather than smearing. There may be an advantage in smearing part of an object and defocusing other parts.

Figure 15:
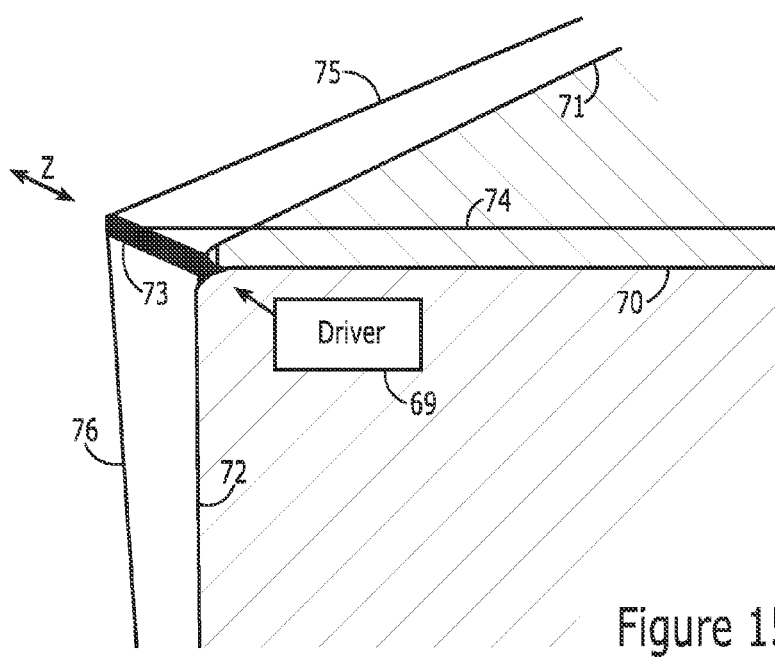
FIG. 15 is a vibrator type modulator useful in alternative embodiments of the invention for special applications.

One type of vibrator for this application is shown in FIG. 15 to which reference is made. In this figure three ridges, 70, 71, and 72, are shown, which need protection or shielding. Ridges typically are the largest radar reflectors, except when the radar wave is normal to a flat surface, which rarely occurs in practice. Three flexible, elastic conductors, 74, 75, and 76, are located just above each of the ridges. These conductors are within one fourth wavelength of the ridges at the frequency of the incident radar signal and, thereby, shield the ridges.

Power source 69 provides power to the actuator 73, symbolically illustrated, which vibrates at a high rate, typically 1 to 100 kilocycles per second, in the direction Z as shown. The Z direction is an approximate bisector of the angles formed by the ridges 70, 71, and 72. The vibration produced by actuator 73 causes movement of the conductors 74, 75, and 76 and, of equal importance, the vibration causes mechanical waves to propagate along the respective conductors to conducting strings or wires at the distant end, not illustrated in the figure. The strings are fixed at the far ends of the conductors and are not illustrated.

Figure 16A:
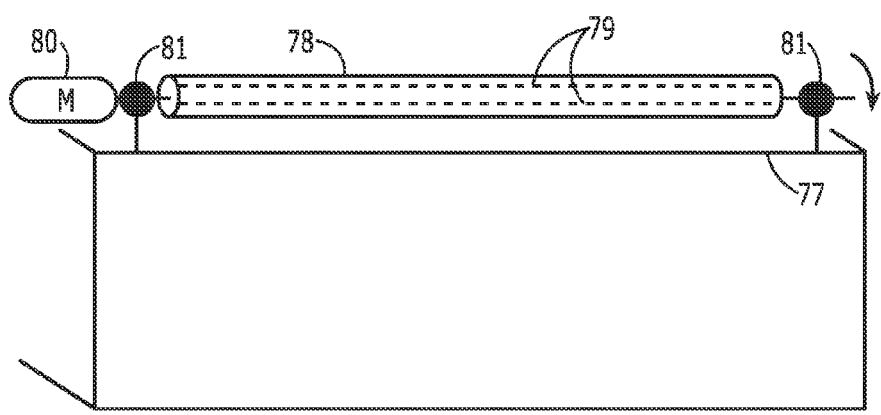
FIGS. 16A, B and C illustrate a rotator type modulator variable reflectivity device useful in alternative embodiments of the system.

Another type of mechanical vibrator is shown in FIGS. 16a, b, and c. This device protects ridge 77. It consists of a small diameter rotating drum 78 supported by bearings 81, and driven by motor 80. Two loops of conductors 79 are located inside the drum 78 and rotate with the drum. These conductors are strings of diodes numbered 82 in FIG. 16b. The diode mutual series separation is less than one fourth wavelength. Hence, when the diodes are not conducting, the conductor loop does not reflect the SAR signal. However, when the diodes in a given loop are conducting, the loop is a good reflector of the SAR signal.

Figure 16B:
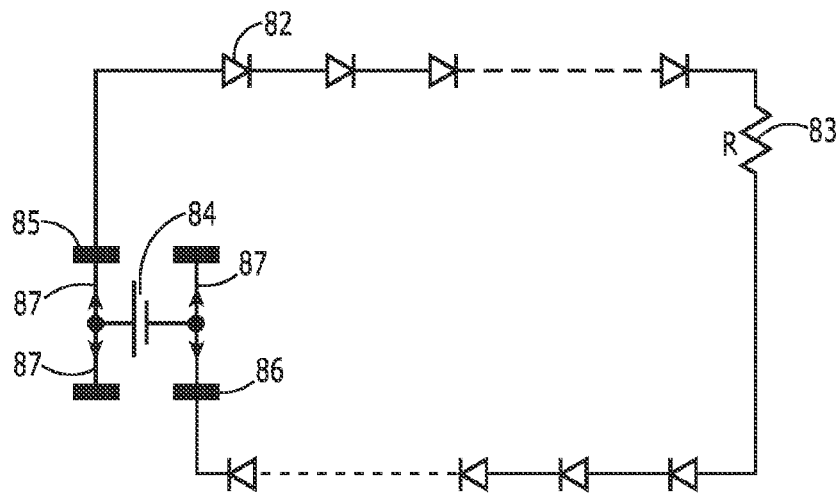
Figure 16C:
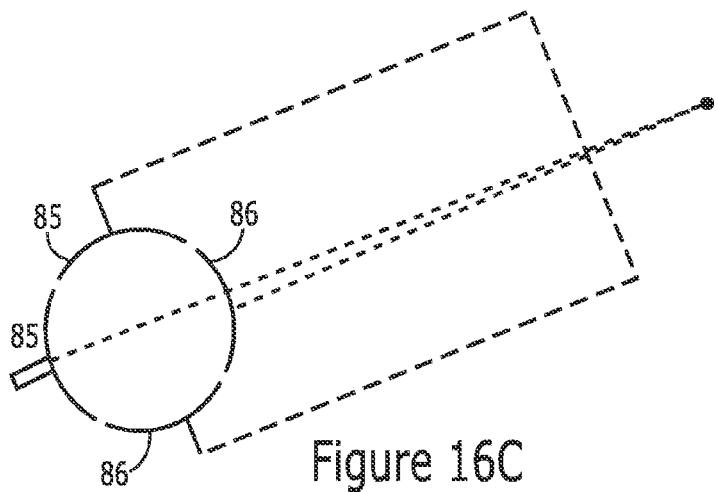

A commutator arrangement shown as 85 and 86 in FIGS. 16b and 16c provide a voltage from battery or power supply 84 to the loop so that the loop reflects when it is moving rapidly in a general up or down direction caused by the drum rotation. When the loop is moving horizontally, the commutator and brushes, 87, remove voltage from the loop to make it non-reflecting. The brushes 87 do not rotate with the drum but rather are fixed inside it. Commutator 85 is the positive voltage terminal of the loop and commutator 86 is the negative terminal.

A typical set of values and parameters for the device of FIG. 16 is:
Ridge 77 Five feet (1.5 m) long
SAR frequency X-Band
Number of diodes per loop 420
Battery voltage 400
Motor and drum RPM 5,000
Diameter of drum 3 cm
Number of loops 79 Two For greater protection, multiple types of protective shields are employed. As a consequence, the protection such shields provides is over a greater band of radar frequencies and a greater number of sidelobes is produced. Vehicles and ships ideally are protected by a variety of these variable reflection devices, suitably mounted atop the locations of highest reflection in order that an appreciable amount of, the incident pulse energy be reflected in sidelobes.

In any new system, the efficacy of the aforedescribed technique is first determined in field testing. Vehicles and other targets, such as airplane wings, when treated with the novel shields presented in this specification should be tested or measured in the process of development. Those skilled in the art recognize the conventional means for making such kind of testing. Such testing is best performed on radar-cross section ranges. These ranges consist basically of a test radar that sends signals to the test target mounted some distance away, and then receives and measures the returned radar echo.

Some difficulty, however, is foreseeable in testing of camouflaged targets that are very small in cross section. The mount used to support the test target may have a larger cross section than the test target, even when the mount is made of a non-conducting material. In the interests of completeness and although not necessary to an understanding of the foregoing invention, the testing difficulty and its resolution is further explored.

In the described case, the cross section of the mount needs to be reduced. This can be accomplished in one or more of three ways: 1) By applying to the mount the novel shields described in this disclosure; 2) By constructing the mount of a dielectric with embedded magnetic particles so that relative permeability is equal relative dielectric constant as described in this disclosure; and/or 3) By constructing the mount of low reflectivity material to be a tall right circular cylinder of a certain diameter.

When mounts must have high physical strength to support heavy targets, they may be constructed of steel that is treated with the novel shields described in this disclosure. For the second way mentioned, the radar cross section of the mount will be proportional to $f(\mu,\epsilon)$ defined as: $f(\mu,\epsilon)=[(\sqrt{\mu}-\sqrt{\epsilon})\div(\sqrt{\mu}+\sqrt{\epsilon})]^2$. As defined earlier, $\mu$ and $\epsilon$ are the relative magnetic permeability and dielectric constant, respectively, of the mount material. When $\mu$ and $\epsilon$ are equal, the cross section is zero.

For the third way, the optimum diameter, D, is such as to cause the Bessel Function of the first kind, $J_1(kD)$, to be zero, where k is 2 times $\Pi$ divided by the wavelength of the radar signal. There are certain values of kD that cause J1(kD) to be zero. These values are often referred to as the roots of J1(kD). Tables of values and plots of J1(kD) versus kD are found in numerous mathematical, scientific, and engineering handbooks. The smallest root of J1(kD) occurs when D is approximately 0.61 wavelengths, so a mount having this diameter would have a very small radar cross section. For the higher frequencies, larger values of D must be used to give the mount greater physical strength.

For both the second and the third ways, listed above, and when the mounts form right circular cylinders, the radar cross section is approximately equal to $f(\mu,\epsilon)=[L \cdot kD \cdot J1(kD)]^2 0\Pi/16$, where L is the length of the column. For very low radar cross section mounts, both $f(\mu,\epsilon)$ and J1(kD) should be made very small according to the novel techniques described here.

As those skilled in the art appreciate, the disclosed variable reflectivity devices that serve as elements of the described electronic camouflaging system are useful in other applications, and, hence, are not limited to that camouflage application. As example, in commercial television application, television viewers who live in areas surrounded by tall buildings often find their television display obscured by "ghosts" occurring when the station signal is reflected off an adjacent building and reaches the television antenna along with the direct signal from the station. By treating the side of the building with a shield of the type described herein the television signal reflected from the building may be shifted in frequency to eliminate the ghosts.

Similarly, airport radar systems are sometimes troubled by unwanted reflections that make an air traffic controller's management and coordination of aircraft more troublesome, as might negatively affect passenger safety. The structures causing those unwanted reflections could be modified to incorporate one of the foredescribed variable reflectivity devices. In operation, the incident RF pulses are modulated to produce radar echoes that are shifted in frequency to one out of the range of the airport's radar, thereby eliminating the interference.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. Apparatus for electronically camouflaging a target to render said target invisible to probing electronic pulse radar signals emitted from a synthetic aperture type radar, comprising:
    shield means for covering at least a portion of said target;
    said shield means including:
        modulation means for transforming radar pulses incident on said shield means to at least two radar echoes that are shifted in frequency above and below the frequency of the incident radar pulse for creating a false depiction of said target at said synthetic aperture type radar.

2. The invention as defined in claim 1, wherein said modulation means further comprises:
    a first layer having a changeable reflectivity characteristic, said characteristic being changeable between an electrically reflective and transparent state; and
    a second layer having a defined constant reflectivity characteristic, said second surface being spaced from said first surface by a predetermined distance;
    driver energy source means for providing output pulses to said first layer to modulate the reflectivity of said first layer, said first layer changing its reflectivity characteristic responsive to output of said driving energy source means.

3. The invention as defined in claim 1, wherein said modulation means further comprises:
    a layer of dielectric material, said layer of dielectric material being located intermediate said first and second layers and spacing said layers apart.

4. The invention as defined in claim 1, wherein said modulation means includes: means for varying the effective distance between the source of said radar signals and said target at a rapid alternating rate, said rapid alternating rate being typically less than one MHz in frequency.

5. The invention as defined in claim 2, wherein said first and second layers are spaced apart by one quarter wavelength of the frequency of radar pulses from said synthetic aperture radar.

6. The invention as defined in claim 1 wherein said driving energy source comprises light source means; and wherein said first layer comprises a photosensitive material.

7. The invention as defined in claim 1, wherein said modulation means further comprises: a variable dielectric material.

8. The invention as defined in claim 7, wherein said variable dielectric material further comprises:
    a layer of dielectric material having a predetermined dielectric constant characteristic;
    a plurality of short wires embedded in said layer, said wires having alternate electrically conductive and nonconductive states, whereby the effective dielectric constant of the variable dielectric material may be changed.

9. The invention as defined in claim 8, wherein said wires comprise a photosensitive material; and, further including:
    light generating means for periodically applying pulses of light on said short wires, whereby the electrical conductivity of said short wires is alternately changed between conductive and non-conductive states.

10. The invention as defined in claim 1, wherein said modulation means further comprises:
    a first surface having a changeable reflectivity characteristic, said characteristic being changeable between an electrically reflective and transparent;
    a second surface having a changeable reflectivity characteristic, said characteristic being changeable between an electrically reflective and transparent; and
    a third surface having a defined constant reflectivity characteristic, said second surface being spaced from said second surface by a predetermined distance and said third surface being spaced from said second surface by said same predetermined distance;
    said first and second layers changing their respective reflectivity characteristic responsive to output of a driving energy source means; and
    driver energy source means for providing output pulses to said first and second layers, whereby said first and second layers rapidly changes its reflectivity characteristic between different levels many times during each second.

11. The invention as defined in claim 10 wherein said predetermined distance comprises one sixth wavelength of the frequency of radar pulses from said synthetic aperture radar.

12. The invention as defined in claim 10 wherein said modulation means further comprises:
    a first layer of dielectric material, said first layer of dielectric material being located intermediate said first and second layers and spacing said layers apart; and
    a second layer of dielectric material, said second layer of dielectric material being located intermediate said second and third layers and spacing said layers apart.

13. The invention as defined in claim 10, wherein said driving energy source comprises: light source means; and wherein said first and second surfaces comprise: a photosensitive material.

14. The invention as defined in claim 1, wherein said modulation means includes: means for directing a form of energy to said first surface to periodically change the reflectively characteristic thereof between said states, said form of energy being distinct in character or degree than said electronic pulse radar signals.

15. The invention as defined in claim 14, wherein said periodic rate comprises between 1 Hz and 10 MHz.

16. The invention as defined in claim 1, wherein said modulation means includes:
    a layer of dielectric material;
    a plurality photosensitive wafers located on the surface of said dielectric material;
    a plurality of electrical conductors;
    said wafers being spaced apart uniformly by less than one quarter wavelength at the frequency of said radar and with said conductors being arranged on said dielectric layer interconnecting adjacent ones of said wafers to thereby form a rectangular grid.

17. The invention as defined in claim 16, wherein said modulation means includes: laser means for providing fluctuating illumination of each of said photosensitive wafers.

18. The invention as defined in claim 1 wherein said modulation means includes:
   a matrix of magnetic particles dispersed throughout a three dimensional body of dielectric material; and
   magnetic modulator means for periodically changing the magnetic state of said magnetic particles, whereby said matrix provides at least two levels of reflectivity to incident pulse radar signals.

19. The invention as defined in claim 18 wherein said magnetic modulator means comprises: a source of pulses of magnetic flux for producing flux in said matrix, said source alternately producing flux of sufficient level to drive said magnetic particles into magnetic saturation and a lower level of flux insufficient in level to drive said particles into magnetic saturation, whereby the magnetic permeability of the matrix is modulated.

20. The invention as defined in claim 1 wherein said modulation means includes:
   illumination source means for producing repetitive bursts of light;
   a body of dielectric material;
   a photosensitive material, said photosensitive material having a predetermined electrical conductivity in the absence of illumination from said source and another electrical conductivity during exposure to illumination from said source;
   said photosensitive material being coupled to said dielectric material and positioned to receive illumination from said illumination source, wherein said combination of materials exhibit a predetermined value of reflectivity and dielectric constant to incident RF energy in the absence of illumination from said source and another value during the presence of such illumination.

21. The invention as defined in claim 20, wherein said body of dielectric material comprises a solid layer of predetermined thickness having upper and lower surfaces; and wherein said photosensitive material comprises: a plurality of short rods, said rods being spaced apart and dispersed throughout said dielectric material.

22. The invention as defined in claim 20 wherein said photosensitive material comprises: a plurality of wafers located in spaced relationship of each other to form an array; a plurality of electrical conductor means, each of said electrical conductor means connecting a respective pair of said adjacent wafers, without contact with any other electrical conductors, to form a grid, whereby responsive to illumination of said wafers said electrical conductor means are placed in common in electrical circuit to form an electrically conductive screen.

23. The invention as defined in claim 1, wherein said modulation means comprises:
   a body of dielectric material having a thickness of one quarter wavelength of the frequency of said pulse radar signals;
   a plurality of switching transistors, said transistors being distributed about said body to define a grid;
   a plurality of electrical conductors, with respective ones of said conductors connecting adjacent transistors to form a plurality of electrically conductive path between adjacent transistors in said grid and defining arms to said grid;
   each of said transistors having a control input, said transistors being responsive to application of a first predetermined control voltage at the respective control input thereof for placing said respective transistor in the conductive state and responsive to a second predetermined voltage for placing said respective transistor in the non-conductive state;
   circuit means for placing said control inputs of said transistors in electrical common circuit; and
   modulator means for applying a periodic switching voltage that varies between said first predetermined voltage and said second predetermined voltage to said control inputs to rapidly continuously change the state of said switching transistors between conducting and non-conducting states;
wherein placing said transistors in the electrically conductive state places all of said arms electrically in common to form a metallic screen in said body that reflects said pulse radar signals.

24. The invention as defined in claim 20 wherein said illumination means comprises:
   arc lamp means for generating and emitting light, responsive to the application of a predetermined voltage for a predetermined interval;
   photoconductor means, said photoconductor means being connected electrically in shunt of said arc lamp means and being optically coupled to said arc lamp means for receiving light emitted by said arc lamp means;
   said photoconductor means being normally in an electrically non-conductive state, responsive to the absence of light from said arc lamp means and changes to the electrically conductive state, responsive to exposure to said light;
   power supply means for supplying a DC voltage in common to said arc lamp means and said photoconductor means to define therewith a relaxation circuit, said voltage being in excess of said predetermined level to operate said arc lamp means, wherein, responsive to emission of light from said arc lamp means, said photoconductor conducts and reduces voltage applied to said arc lamp means below said predetermined level to thereby extinguish said arc lamp means.

25. The invention as defined in claim 1, wherein said modulation means comprises: a reflector for reflecting incident pulse radar signals; and means for rapidly varying the position of said reflective surface relative to said synthetic aperture type radar.

26. The invention as defined in claim 25, wherein said reflector comprises:
   a hollow drum having an axis, said drum being mounted for rotation about said axis;
   electrical commutator means carried by said drum;
   a plurality of electrical diodes and at least one electrical resistance means disposed within said drum and being connected in electrical series circuit across said commutator means at a first position thereon with adjacent diodes being spaced from one another by less than one-half wavelength, wherein said diodes conduct current in response to voltage of a first polarity applied by said commutator means and block current in response to voltage of the opposite polarity applied by said commutator means; said diodes and resistance means defining an elongate loop with said loop being disposed within said drum and being rotated with said drum;
   a second plurality of electrical diodes and at least one second electrical resistance means disposed within said drum and being connected in electrical series circuit across said commutator means at a second position thereon with adjacent diodes being spaced from one another by less than one-half wavelength, wherein said diodes conduct current in response to voltage of a first polarity applied by said commutator means and block current in response to voltage of the opposite polarity applied by said commutator means; said diodes and resistance means defining a second elongate loop with said second loop being disposed within said drum and being oriented in said drum orthogonal to said first loop and being rotated with said drum;

electrical DC source means connected to said commutator means for applying a DC voltage thereto; and wherein said for rapidly varying the position of said reflective surface relative to said synthetic aperture type radar, comprises: motor means for rotating said drum, whereby each of said first loop and second loop alternately conduct current only during predetermined angular positions in the rotation of said drum.

27. The invention as defined in claim 3, wherein said dielectric includes electrically non-conductive particles dispersed in said layer, wherein said layer is of a constant impedance of predetermined level.

28. The invention as claimed in claim 27, wherein the said embedded electrically non-conductive particles have a magnetic permeability greater than unity and wherein said predetermined impedance level is approximately 377 ohms.

29. A variable reflectance device for selectively providing at least two levels of reflectivity to incident RF of a predetermined frequency, comprising:
a matrix of magnetic particles dispersed throughout a three dimensional body of dielectric material;
magnetic modulator means for periodically changing the magnetic state of said magnetic particles.

30. The invention as defined in claim 29, wherein said magnetic modulator means comprises: a source of pulses of magnetic flux for producing flux in said matrix, said source alternately producing flux of sufficient level to drive said magnetic particles into magnetic saturation and a lower level of flux insufficient in level to drive said particles into magnetic saturation, whereby the magnetic permeability of the matrix is modulated.

31. A variable dielectric comprising:
an illumination source;
a body of dielectric material;
a photosensitive material, said photosensitive material having a predetermined electrical conductivity in the absence of illumination from said source and another electrical conductivity during exposure to illumination from said source;
said photosensitive material being coupled to said dielectric material and positioned to receive illumination from said illumination source, wherein said combination of materials exhibit a predetermined value of reflectivity and dielectric constant to incident RF energy in the absence of illumination from said source and another value during the presence of such illumination.

32. The invention as defined in claim 31, wherein said body of dielectric material comprises a solid layer of predetermined thickness having upper and lower surfaces; and wherein said photosensitive material comprises: a plurality of short rods, said rods being spaced apart and dispersed throughout said dielectric material.

33. The invention as defined in claim 32, wherein said illumination source comprises a laser.

34. The invention as defined in claim 31, wherein said photosensitive material further comprises:
a first thin layer having a changeable reflectivity characteristic, said characteristic being changeable between an electrically reflective and transparent state responsive to illumination from said illumination source; and
a second thin layer having a defined constant reflectivity characteristic, said second surface being underlying of said first layer.

35. The invention as defined in claim 34, wherein said body of dielectric material comprises a dielectric layer of solid material of predetermined thickness and is located in between said first and second thin layers with said dielectric layer supporting each of said layers.

36. The invention as defined in claim 35, wherein said photosensitive material further comprises a third thin layer located intermediate and in spaced relationship to said first and second thin layers and underlying said first thin layer, said third thin layer having a changeable reflectivity characteristic, said characteristic being changeable between an electrically reflective and transparent state responsive to illumination from said illumination source; and wherein said dielectric material comprises at least two dielectric layers of solid material of predetermined thickness; one of said dielectric layers being located in between said first and third thin layers with said dielectric layer supporting said first thin layer; and the other of said dielectric layers being located in between said third and second thin layers; and said dielectric being substantially transparent or translucent to illumination wherein illumination from said illumination source may reach said third thin layer.

37. The invention as defined in claim 31, wherein said photosensitive material comprises: a plurality of wafers in spaced relationship of each other to form an array; a plurality of electrical conductor means, each of said electrical conductor means connecting a respective pair of said adjacent wafers, without contact with any other electrical conductors, to form a grid, whereby responsive to illumination of said wafers said electrical conductor means are placed in common in electrical circuit to form an electrically conductive screen.

38. A variable reflectance device for selectively providing at least two levels of reflectivity to incident RF of a predetermined frequency, comprising:
a body of dielectric material having a thickness of one quarter wavelength at said frequency;
a plurality of switching transistors, said transistors being distributed about said body to define a grid;
a plurality of electrical conductors, with respective ones of said conductors connecting adjacent transistors to form a plurality of electrically conductive path between adjacent transistors in said grid and defining arms to said grid;
each of said transistors having a control input, said transistors being responsive to application of a first predetermined control voltage at the respective control input thereof for placing said respective transistor in the conductive state and responsive to a second predetermined voltage for placing said respective transistor in the non-conductive state;
circuit means for placing said control inputs of said transistors in electrical common circuit; and
modulator means for applying a periodic switching voltage that varies between said first predetermined voltage and said second predetermined voltage to said control inputs to rapidly continuously change the state of said switching transistors between conducting and non-conducting states;

wherein placing said transistors in the electrically conductive state places all of said arms electrically in common to form a metallic screen in said body that reflects RF at said frequency.

39. The invention as defined in claim 38, further comprising: a bottom layer of material having a constant reflectivity characteristic located on the underside of said body of dielectric material.

40. Apparatus for producing pulses of light, comprising:
arc lamp means for generating and emitting light, responsive to the application of a predetermined voltage for a predetermined interval;
photoconductor means, said photoconductor means being connected electrically in shunt of said arc lamp means and being optically coupled to said arc lamp means for receiving light emitted by said arc lamp means;
said photoconductor means being normally in an electrically non-conductive state, responsive to the absence of light from said arc lamp means and changes to the electrically conductive state, responsive to exposure to said light;
power supply means for supplying a DC voltage in common to said arc lamp means and said photoconductor means to define therewith a relaxation circuit, said voltage being in excess of said predetermined level to operate said arc lamp means, wherein, responsive to emission of light from said arc lamp means, said photoconductor conducts and reduces voltage applied to said arc lamp means below said predetermined level to thereby extinguish said arc lamp means.

41. The invention as in claim 40 wherein the said arc lamp means comprises:
a chamber having a transparent window;
a pair of spaced electrical contacts located in said chamber defining a gap;
said chamber containing a gas mixture that produces light of a desired wavelength in response to an electrical arc produced across said gap; and wherein said DC power supply means includes voltage adjustment means for controlling the duration of light pulses emitted by said arc lamp means.

42. A radar energy reflector device, comprising:
a hollow drum having an axis, said drum being mounted for rotation about said axis;
means for rotating said drum;
electrical commutator means carried by said drum;
a plurality of electrical diodes and at least one electrical resistance means disposed within said drum and being connected in electrical series circuit across said commutator means at a first position thereon with adjacent diodes being spaced from one another by less than one-half wavelength, wherein said diodes conduct current in response to voltage of a first polarity applied by said commutator means and block current in response to voltage of the opposite polarity applied by said commutator means; said diodes and resistance means defining an elongate loop with said loop being disposed within said drum and being rotated with said drum;
a second plurality of electrical diodes and at least one second electrical resistance means disposed within said drum and being connected in electrical series circuit across said commutator means at a second position thereon with adjacent diodes being spaced from one another by less than one-half wavelength, wherein said diodes conduct current in response to voltage of a first polarity applied by said commutator means and block current in response to voltage of the opposite polarity applied by said commutator means; said diodes and resistance means defining a second elongate loop with said second loop being disposed within said drum and being oriented in said drum orthogonal to said first loop and being rotated, with said drum;
electrical DC source means connected to said commutator means for applying a DC voltage thereto, whereby each of said first loop and second loop alternately conduct current only during predetermined angular positions in the rotation of said drum.

43. The method of defeating detection of a remote radar reflective target by synthetic aperture radars, comprising the steps of:
modulating, at the location of said radar reflective target, the effective distance between the radar source and the radar reflective target at a predetermined rate sufficiently great to create, using the incident radar signal from said synthetic aperture radar, at least two distinct Doppler signals and returning said two distinct Doppler signals to said synthetic aperture radar, each said Doppler signal being shifted in frequency from the frequency of the incident radar signal, whereby said synthetic aperture radar receives false information of the target; and
returning said Doppler signals to said synthetic aperture radar.

44. The method as defined in claim 43, wherein said step of modulating includes the step of varying the dielectric constant characteristic of a layer of dielectric material of predetermined thickness at a rate of at 1 Hz to 10 MHz.

45. The method as defined in claim 43, wherein said step of modulating includes the step of varying the magnetic permeability of a sheet of material of predetermined thickness at a rate of 1 Hz to 10 MHz.

46. The method as defined in claim 43, wherein said step of modulating includes the step of varying the electrical reflectivity of a surface of a sheet of material of predetermined thickness at a rate of in the range of 1 Hz to 10 MHz.

47. The method defined in claim 43, wherein said step of modulating includes the step of rapidly periodically varying the apparent distance between said radar and a radar reflecting surface.

* * * * *